United States Patent Office 3,293,307
Patented Dec. 20, 1966

3,293,307
PREPARATION OF SUBSTITUTED ETHANES
Edward J. McNelis, Wallingford, Pa., assignor to Sun Oil Company, Philadelphia, Pa., a corporation of New Jersey
No Drawing. Filed Dec. 23, 1963, Ser. No. 332,925
12 Claims. (Cl. 260—619)

This invention relates to substituted ethanes and more particularly to a method for preparing substituted ethanes having the general formula

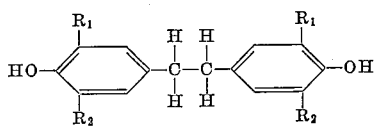

wherein $R_1$ and $R_2$ are selected from the group consisting of alkoxy radicals having from 1 to 8 carbon atoms and alkyl radicals having from 1 to 8 carbon atoms.

Substituted ethanes having the above general formula are particularly useful as antioxidants. They also find utility as intermediates in the preparation of epoxy resins, for example, by reaction with epichlorohydrin and as intermediates in the preparation of polycarbonates, for example, by reaction with phosgene. The preparation of substituted ethanes has been described in the prior literature. For example 1,2-bis(3,5-dimethyl-4-hydroxyphenyl)ethane has been prepared by oxidizing mesitol to the corresponding stilbenequinone and subsequently reducing the stilbenequinone to the substituted ethane. These types of compounds have also been prepared by the autoxidation of mesitol with ferric stearate in cumene.

A method has now been found wherein substituted ethanes having the above general formula can be prepared directly from a substituted p-cresol by reaction with silver oxide.

Briefly stated the instant invention comprises a method for preparing substituted ethanes by reacting a molar excess of substituted p-cresol with silver oxide in an inert atmosphere at a temperature in the range of from about 0° C. to 100° C. for a period of time ranging between 10 seconds and 10 hours. It is believed that the following reaction occurs:

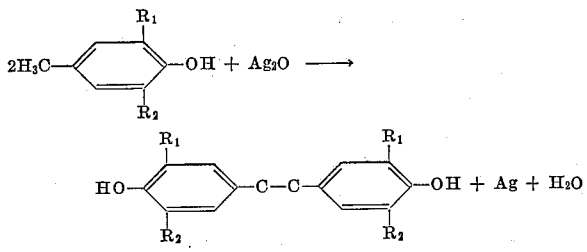

Suitable starting material which can be used to prepare the substituted ethanes in accordance with the instant invention have the general formula

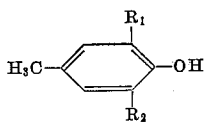

wherein $R_1$ and $R_2$ are selected from the group consisting of alkoxy radicals having from 1 to 8 carbon atoms and alkyl radicals having from 1 to 8 carbon atoms. Examples of specific compounds include: mesitol (2,4,6-trimethylphenol); 2,6-dimethyl-p-cresol; 2,6-diethyl-p-cresol; 2-methyl-6-ethyl-p-cresol; 2,6-di-n-propyl-p-cresol; 2,6-di-t-butyl-p-cresol; 2,6-d-n-hexyl-p-cresol; 2-methyl-6-t-butyl-p-cresol; 2-s-hexyl-6-n-amyl-p-cresol; 2,6-di-n-octyl-p-cresol; 2-n-heptyl-6-isooctyl-p-cresol; 2,4,6-trimethoxyphenol; 2,6-dimethoxy-p-cresol; 2,6-diethoxy-p-cresol; 2-methoxy-6-ethoxy-p-cresol; 2,6-di-n-propoxy-p-cresol; 2,6-di-t-butoxy-p-cresol; 2,6-di-n-hexoxy-p-cresol; 2-methoxy-6-t-butoxy-p-cresol; 2-s-hexoxy-6-n-pentoxy-p-cresol; 2,6-di-n-octoxy-p-cresol and 2-n-heptoxy-6-isooctoxy-p-cresol.

As stated above, in accordance with this invention the substituted p-cresol is reacted with silver oxide to produce the substituted ethane. The reaction is to be done in an inert atmosphere. If an inert atmosphere is not used the desired products will not be formed and in lieu thereof there will be produced quinone-type materials. Examples of inert atmospheres which can be used in this invention include nitrogen, carbon dioxide, methane, etc.

It is preferred that prior to reacting the substituted p-cresol with the silver oxide it be dissolved in a suitable solvent and the silver oxide added to the resulting solution. Examples of suitable solvents which can be used in this invention include chloroform, benzene, toluene, nitrobenzene, dimethylformamide, ethyl ether and petroleum ether. Chloroform and benzene are the preferred solvents.

The temperature at which the silver oxide-substituted p-cresol or silver oxide-solution of substituted p-cresol is reacted can vary over a wide range. If the substituted p-cresol is not contained in a solvent the maximum temperature to which the reaction mixture should be heated is 100° C. If, on the other hand, the substituted p-cresol is contained in a solvent prior to reacting with the silver oxide, so long as the solvent does not have a boiling point greater than 100° C. at the pressure employed the solution may be heated at reflux temperature. While temperatures in the range of 0° C. to 100° C. can be used in this invention it is preferred that a temperature in the range of from 0° C. to about 50° C. be used.

The time of reaction can vary between 10 seconds and 10 hours. It is preferred that the reaction time be in the range of from 0.1 hour to 2 hours.

It has been found that the molar ratio of substituted p-cresol to silver oxide is extremely important to the success of this invention. If a molar ratio is used wherein the amount of silver oxide used is greater than the amount of substituted p-cresol, the desired products will not be formed, rather substituted quinones will be produced. As a result the molar ratio of substituted p-cresol to silver oxide must be at least 1:1 and more preferably is at least 2:1 and can range up to as high as 100:1. Generally it has been found that no technological benefits are apparent at a molar ratio greater than about 10:1.

To recover the desired product, the solid silver and any unreacted silver oxide are separated from the reaction mixture by conventional methods, such as by filtration. The solid phase is washed with benzene and diethyl ether to recover any residual product absorbed thereon. The filtrate is then washed with dilute (5%) alkali metal hydroxide to convert all of the phenolic materials contained therein to the corresponding alkali metal salts which dissolve in the aqueous phase. The latter is acidified with a mineral acid to precipitate a mixture of desired phenolic product and any unreacted substituted p-cresol. The precipitate is separated from the supernatant liquid by conventional means such as filtration. The filtrate is extracted with diethyl ether to remove any additional phenolic products dissolved therein. The ether extract and the precipitated materials are combined and evaporated to dryness. The residue is extracted with low boiling petroleum ether. That portion of the residue which does not dissolve in the low boiling petroleum ether is the desired substituted ethane product. It may be further purified by recrystallization from high boiling petroleum ether.

The following examples serve to further illustrate the instant invention:

EXAMPLE I

To 4.4 grams of mesitol contained in 50 ml. of benzene, there is added 2.3 grams of dry silver oxide. The resulting mixture is maintained under an atmosphere of nitrogen at ambient temperature (20° C.) for 15 minutes to permit the reaction to proceed. Solid silver and any unreacted silver oxide are separated from the benzene solution by filtration and washed successively with 100 ml. of benzene and 50 ml. of diethyl ether. The filtrate and the washes are combined and extracted with 200 ml. of 5 percent sodium hydroxide. The basic solution is acidified by the dropwise addition of concentrated hydrochloric acid to precipitate a mixture of substituted ethane product and any unreacted mesitol which are separated by filtration. The filtrate is extracted with two 200 ml. portions of diethyl ether. The ether solution is combined with the precipitated materials, washed with water, dried over magnesium sulfate and evaporated to dryness. The residue is triturated with 400 ml. of petroleum ether having a boiling point of 30–60° C. The residue that did not dissolve in the petroleum ether is separated and recrystallized from high boiling petroleum ether. The product has an infrared spectrum of a phenol, a mass spectral peak showing a molecular weight of 270 and a melting point of 168–169° C. as compared to a calculated molecular weight of 270 and a melting point of 167–168° C. reported in the literature for 1,2-bis(3,5-dimethyl-4-hydroxyphenyl) ethane. The yield of product is 96% based on the silver oxide.

EXAMPLE II

Example I is repeated with the exception that a molar excess of silver oxide was used in the presence of air. The substituted ethane reported in Example I is not obtained, rather the product is a substituted stilbenequinone. This example clearly demonstrates that a molar excess of substituted p-cresol and an inert atmosphere is necessary to the success of this invention.

Substantially similar results are obtained as presented in Example I when other of the solvents named above are substituted for benzene and any other substituted p-cresols such as 2,6-diethyl-p-cresol, 2,6-di-t-butyl-p-cresol or 2,4,6-trimethoxyphenol are used in place of mesitol.

I claim:

1. Method for preparing substituted ethanes having the general formula

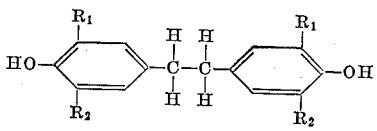

wherein $R_1$ and $R_2$ are selected from the group consisting of alkoxy radicals having from 1 to 8 carbon atoms and alkyl radicals having from 1 to 8 carbon atoms which comprises reacting substituted p-cresol having the general formula

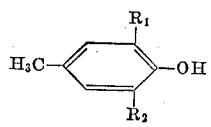

with silver oxide at a temperature in the range of from 0° C. to 100° C. in an inert atmosphere for a period of time ranging between 10 seconds and 10 hours wherein the molar ratio of substituted p-cresol to silver oxide is at least 1:1 and thereafter recovering said substituted ethane product.

2. Method in accordance with claim 1 wherein the temperature is in the range of from 0° C. to 50° C. and the time is in the range of from 0.1 hour to 2 hours.

3. Method for preparing substituted ethanes having the general formula

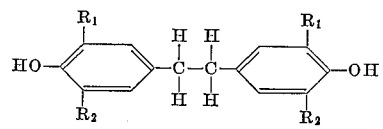

wherein $R_1$ and $R_2$ are selected from the group consisting of alkoxy radicals having from 1 to 8 carbon atoms, and alkyl radicals having from 1 to 8 carbon atoms which comprises dissolving a substituted p-cresol having the general formula

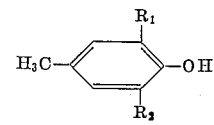

in a solvent and reacting the resulting solution with silver oxide at a temperature in the range of from 0° C. to 100° C. in an inert atmosphere for a period of time ranging between 10 seconds and 10 hours wherein the molar ratio of substituted p-cresol to silver oxide is at least 1:1 and thereafter recovering said substitued ethane product.

4. Method in accordance with claim 3 wherein said solvent is selected from the group consisting of chloroform, benzene, toluene, nitrobenzene, and dimethylformamide.

5. Method in accordance with claim 4 wherein the temperature is in the range of from 0° C. to 50° C. and the time is in the range of from 0.1 hour to 2 hours.

6. Method in accordance with claim 3 wherein the temperature is in the range of from 0° C. to 50° C. and the time is in the range of from 0.1 hour to 2 hours.

7. Method for preparing 1,2-bis(3,5-dimethyl-4-hydroxyphenyl)ethane which comprises reacting mesitol with silver oxide at a temperature in the range of from 0° C. to 100° C. in an inert atmosphere for a period of time ranging between 10 seconds and 10 hours wherein the molar ratio of mesitol to silver oxide is at least 1:1 and thereafter recovering said 1,2-bis(3,5-dimethyl-4-hydroxyphenyl)ethane.

8. Method in accordance with claim 7 wherein the temperature is in the range of from 0° C. to 50° C. and the time is in the range of from 0.1 hour to 2 hours.

9. Method for preparing 1,2-bis(3,5-dimethyl-4-hydroxyphenyl)ethane which comprises dissolving mesitol in a solvent and reacting the resulting solution with silver oxide at a temperature in the range of from 0° C. to 100° C. in an inert atmosphere for a period of time ranging between 10 seconds and 10 hours wherein the molar ratio of mesitol to silver oxide is at least 1:1 and thereafter recovering said 1,2-bis(3,5-dimethyl-4-hydroxyphenyl)-ethane.

10. Method in accordance with claim 9 wherein said solvent is selected from the group consisting of chloroform, benzene, toluene, nitrobenzene, and dimethylformamide.

11. Method in accordance with claim 10 wherein the temperature is in the range of from 0° C. to 50° C. and the time is in the range of from 0.1 hour to 2 hours.

12. Method in accordance with claim 9 wherein the temperature is in the range of from 0° C. to 50° C. and the time is in the range of from 0.1 hour to 2 hours.

References Cited by the Examiner

UNITED STATES PATENTS 2,792,428   5/1957   Pikl _____ 260—619

LEON ZITVER, *Primary Examiner.*

D. M. HELFER, *Assistant Examiner.*